United States Patent
Baensch

[15] 3,664,303
[45] May 23, 1972

[54] FISH FOOD HOLDER

[72] Inventor: Ulrich Baensch, Herrenteich 70, 452 Melle, Germany

[22] Filed: June 17, 1970

[21] Appl. No.: 46,869

[30] Foreign Application Priority Data

June 24, 1969  Germany.....................G 69 25 057.3

[52] U.S. Cl..................................................119/51, 119/5
[51] Int. Cl. .....................................................A01k 61/02
[58] Field of Search..................................................119/5, 51

[56] References Cited

UNITED STATES PATENTS

| 2,984,208 | 5/1961 | Kopietz | 119/51 R |
| 3,140,692 | 7/1964 | Beyea | 119/51 R |
| 2,961,994 | 11/1960 | Kopietz | 119/51 R |
| 2,754,800 | 7/1956 | Gare | 119/5 |

*Primary Examiner*—Hugh R. Chamblee
*Attorney*—Walter Becker

[57] ABSTRACT

A fish food holder for aquariums with one or more recesses provided in the lower portions of a non-floatable body while the upper portion of said body includes suspension means for suspending said fish food holder at a desired height.

8 Claims, 2 Drawing Figures

PATENTED MAY 23 1972
3,664,303
FIG.1
FIG.2
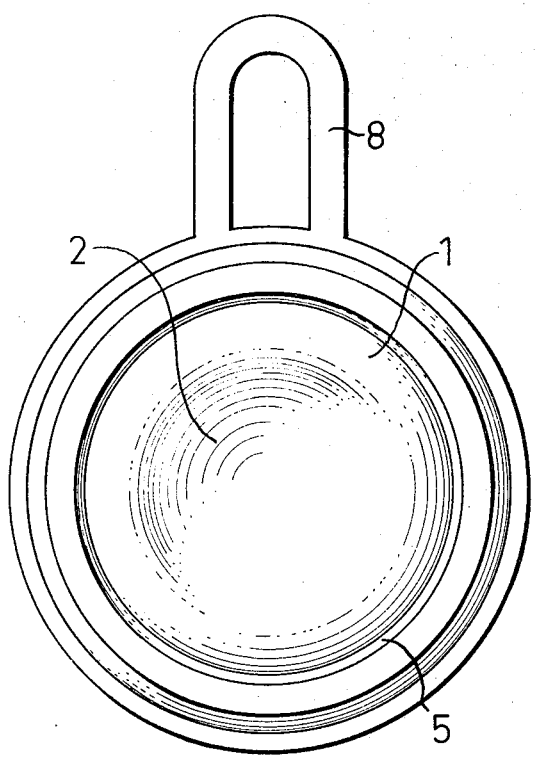
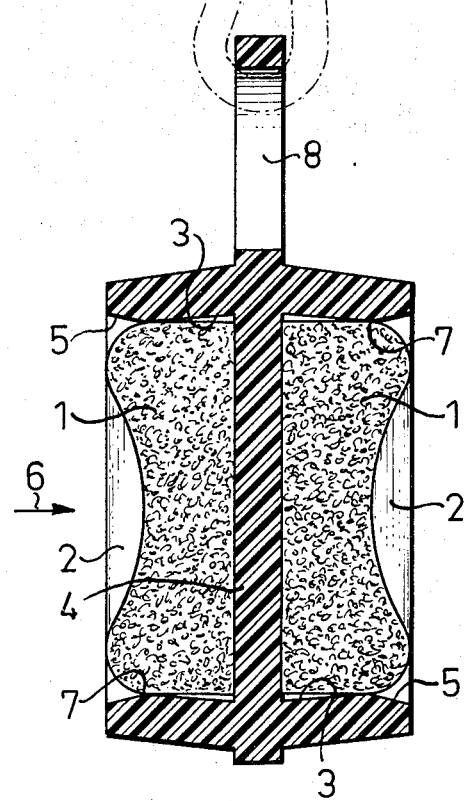
INVENTOR
Ulrich Baensch
By

FISH FOOD HOLDER

The present invention relates to a fish food holder for aquariums with one or more recesses or depressions for receiving food tablets. Heretofore known fish food holders form floating bodies. The food tablets held therein are thus kept in the vicinity of the water surface and can, therefore, be consumed only by so-called surface fish. Thus, the possibility of use of such fish food holders is limited.

It is, therefore, an object of the present invention so to design fish food holders of the above referred to type that the food tablets held thereby can be offered to the fish at different levels.

This object and other objects and advantages of the invention will appear more clearly from the following specification in connection with the accompanying drawing, in which:

FIG. 1 illustrates a view of a fish food holder for aquariums according to the invention.

FIG. 2 shows a vertical transverse cross-section through the fish food holder according to FIG. 1.

The fish food holder according to the present invention is characterized primarily in that the recesses or depressions of the non-floatable fish food holder are located in the lower part of the holder whereas the fish food holder is at its upper part provided with an eye, a hook, or the like for mounting a thread intended for suspending the fish food holder.

In view of the above described design of the fish food holder, it is possible by varying the effective length of the thread or cord to vary the adjustment as to height of the fish food holder and thus of the fish food within any desired limits. It is even possible to lower the fish food holder to the bottom of the aquarium for offering the food to the fish which will preferably or exclusively pick the food from the bottom of the aquarium. It is also possible to arrange the fish food holder in the manner of a free pendulum or between rocks or the like.

The fish food holder according to the invention is preferably a body made of synthetic material in which the recesses may be dimensioned precisely in conformity with the size of the food tablets in such a way that by simply pressing the tablets into the recesses, the tablets will be firmly held therein even when parts of the tablets have already been consumed by the fish.

Referring now to the drawing in detail, the fish food holder is made of a non-floatable synthetic material and represents a pressed molded body. This molded body is true to size, which is of importance, with regard to the food tablets 1 to be received thereby, the food tablets having a diameter of from 12 to 15 mm.

In most instances, the food holder is on opposite sides provided with recesses 2 which are substantially cylindrical in the manner of blind holes.

The recesses 2 have slightly conical lateral surfaces 3 in such a way that their diameter within the range of the partition 4 is greater than within the range of the opening of the recesses 2. The marginal areas of the openings are baffled to a considerable extent. This baffling is indicated by the reference numeral 5. The surfaces 5 taper in opposite direction. The inclined surfaces 5 which, if desired, may also be replaced by rounded areas have the advantage that the food tablets 1 can in a simple manner by hand or, more specifically by finger pressure in the direction of the arrow 6 be pressed into the recesses 2.

A safe holding of the food tablets is obtained by means of the protrusion 7 which is the result of the inclined surfaces 3 and 5 and which engages the tablets 1 along a circumferential line. The free diameter determined by the protrusion 7 and pertaining to the recess 2 is so dimensioned that the food tablet 1 is held under a slight elastic pretension, said pretension or preload being introduced by pressing the food tablet 1 into the recess 2 in the body of the food holder. This diameter is also slightly less than the outer diameter of the food tablet 1. In this way it will be assured that the tablet 1, when being pressed in, will not be damaged and will not drop out from the recess 2 when the major part of the tablet has been consumed by the fish. In the upper part of the food holder there is along the extension of the intermediate wall or partition 4 provided a molded-on eye 8 through which a thread or cord 9 is pulled. This thread or cord 9 serves for suspending the food holder in the aquarium. The thread 9 may at its upper end be connected, for instance, to the marginal area of the aquarium. When the food tablet 1 has been consumed, the food holder is by means of the thread 9 pulled upwardly. After the food holder has been equipped with a new tablet, it is again lowered into the aquarium. If desired, the thread 9 may be connected to a floating body. In this instance a variation in the location of the food holder will be possible.

A design of the fish food holder according to the invention in such a way that it holds food tablets on opposite sides of an intermediate wall has the advantage that the fish can consume food from opposite sides of the holder.

It is, of course, to be understood that the present invention is, by no means, limited to the particular showing in the drawing but also comprises any modifications within the scope of the appended claims.

What I claim is:

1. A food holder, especially for home aquariums for receiving and holding therein fish food in the form of a fish food tablet, said holder being molded from a resilient material heavier than water and comprising a body portion adapted to be immersed into the water contained in an aquarium and having at least one end face including resilient flange means providing a recess means for receiving and frictionally by press fit directly holding therein fish food in the form of a tablet dimensional to engage and slightly spread said flange means, said holder also comprising a second portion integral with said body portion and adapted to receive and hold means for suspending said holder immersed in the water at any desired level.

2. A food holder according to claim 1, in which the diameter of said recess means increases toward the bottom portion thereof.

3. A food holder according to claim 2, in which the body portion has a pair of end faces that are respectively provided with oppositely located recesses separated from each other by a central partition forming a common wall therebetween.

4. A food holder according to claim 3, in which said central partition is connected with said second portion that is in the form of an outward extension provided with an eye.

5. A food holder according to claim 4, in which the axes of said recess means are approximately horizontal when said fish food holder is in its position of use.

6. A food holder according to claim 5, in which the marginal portion of said recess means is flaring outwardly to facilitate the introduction of fish food tablets.

7. A food holder according to claim 5, in which said recess means has a depth approximately within the range of 5 to 6 millimeters.

8. A food holder according to claim 5, in which the free diameter of said recess means within the marginal region thereof is from 12 to 15 millimeters.

* * * * *